July 6, 1948.  R. W. MAY  2,444,840
AUTOMATIC TUNING CONTROLS FOR RADIO
APPARATUS AND THE LIKE
Filed Oct. 29, 1946  4 Sheets-Sheet 1
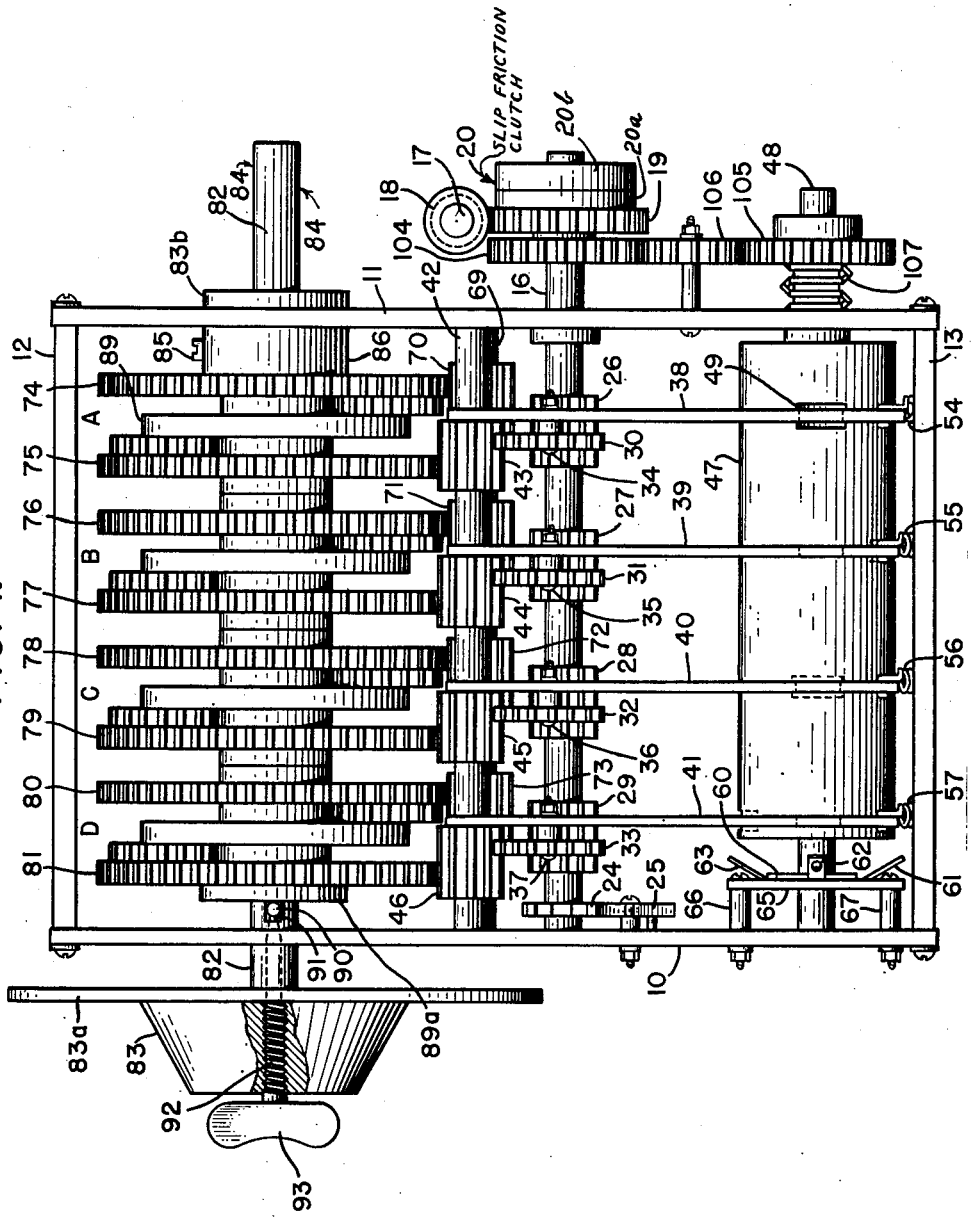
FIG. I.
INVENTOR.
RICHARD W. MAY
BY
John J. Logan
ATTORNEY

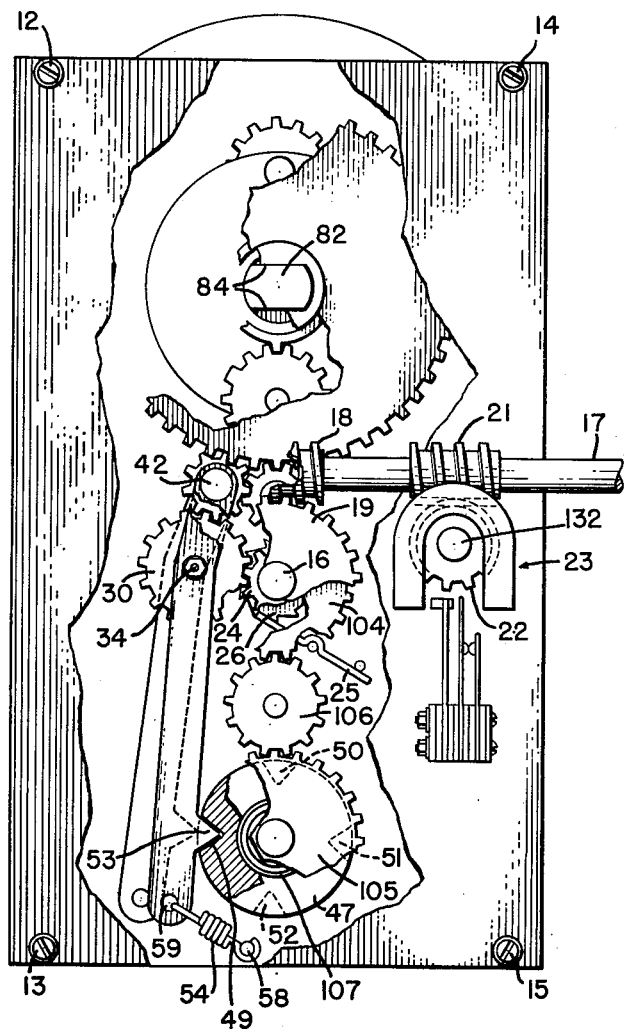

July 6, 1948.  R. W. MAY  2,444,840
AUTOMATIC TUNING CONTROLS FOR RADIO
APPARATUS AND THE LIKE
Filed Oct. 29, 1946  4 Sheets-Sheet 3
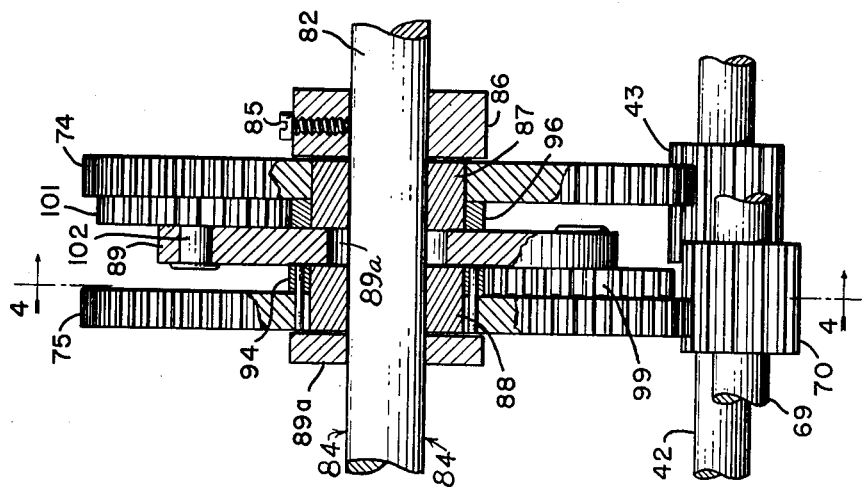
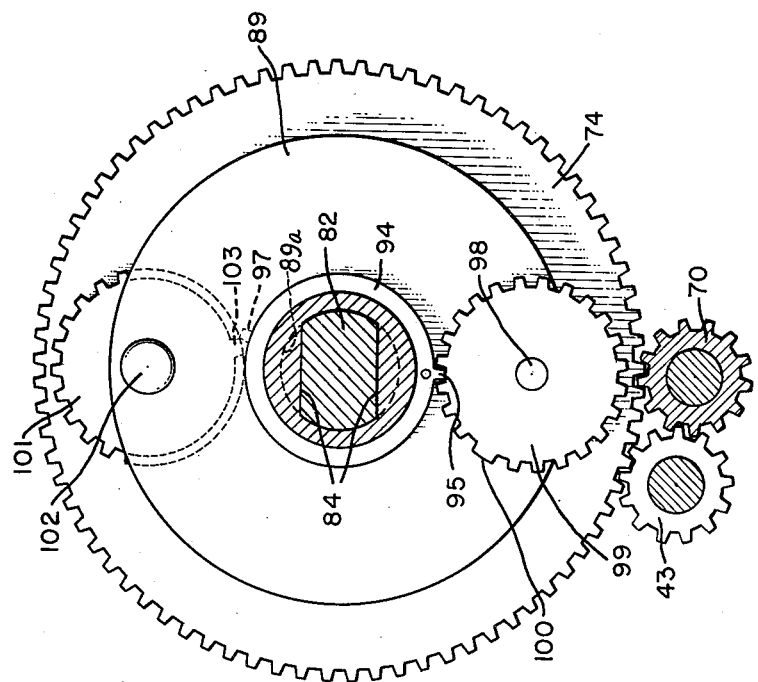
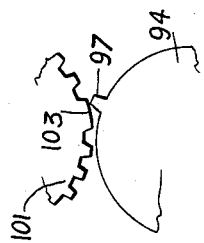
INVENTOR.
RICHARD W. MAY
BY
John J. Rogan
ATTORNEY

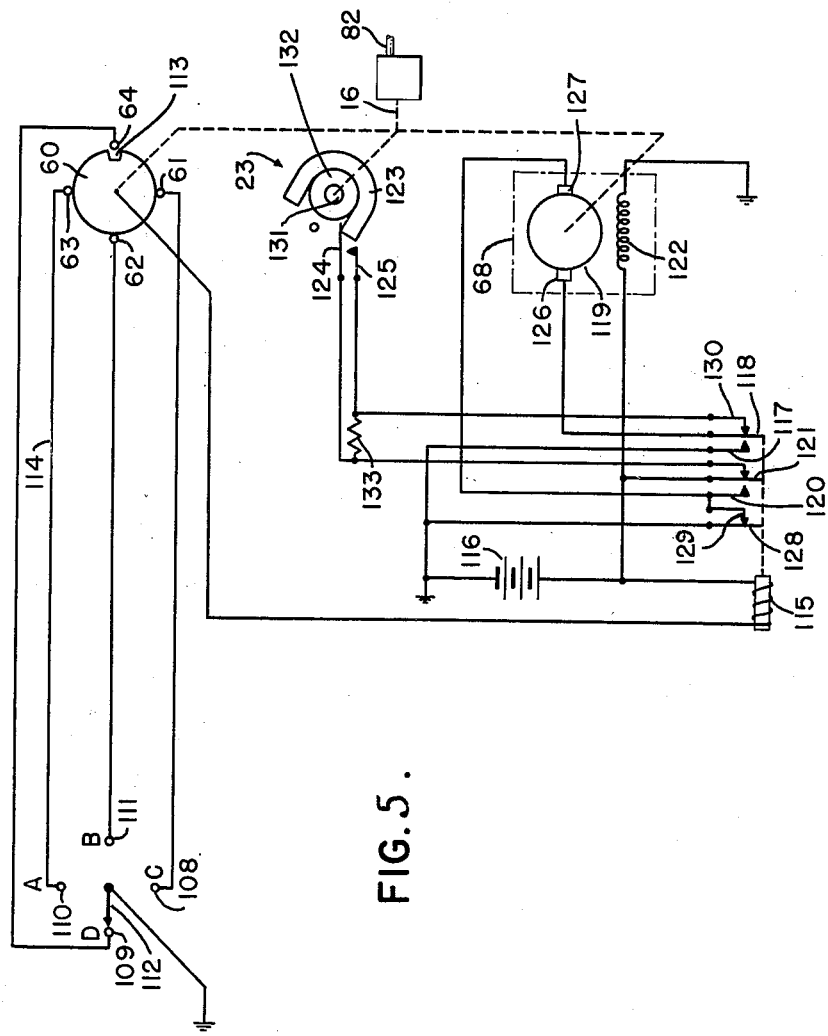

Patented July 6, 1948

2,444,840

UNITED STATES PATENT OFFICE 2,444,840

AUTOMATIC TUNING CONTROL FOR RADIO APPARATUS AND THE LIKE

Richard W. May, Cedar Rapids, Iowa, assignor to Collins Radio Company, Cedar Rapids, Iowa, a corporation of Iowa Application October 29, 1946, Serial No. 706,453

19 Claims. (Cl. 74—10)

This invention relates to automatic control arrangements for radio apparatus and the like, and more particularly to improved automatic shaft positioning devices.

A principal object of the invention relates to an automatic shaft positioning arrangement for radio apparatus and the like, employing a plurality of shaft stopping units each including a pair of oppositely rotatable elements whose conjoint rotation to a mutual stopping point determines the stopping of the shaft, in conjunction with an associated series of cam-controlled pawls for selectively rendering any desired one of said units effective on said shaft.

Another object is to provide an automatic shaft positioning device for radio apparatus and the like, employing a plurality of shaft stopping units each having a pair of oppositely rotatable intermittent gears which are actuated by respective single toothed stop rings to rotate the gears to a mutual stopping point corresponding to the desired position of the shaft, in conjunction with an associated series of cam-controlled pawls for selectively rendering any desired one of the units effective on the said shaft.

A further object is to provide a remote control arrangement for a master shaft, employing a selector switch and cam-drum combination, and special gear train units one for each selective position of the master shaft, the said gear train units each including a shiftable transmission gear rendered selectively effective to provide power to said shaft under control of the selective setting of said drum.

A feature of the invention relates to a master shaft to be selectively positioned under control of a plurality of selectively operable shaft stopping units, each unit comprising a pair of oppositely rotatable intermittent gears whose conjoint rotation causes the transmission of power to said shaft, and whose mutual stopping determines the stopping of said shaft. The units are rendered selectively operable on the shaft under control of a selectively rotatable cam drum and a series of intervening selectively shiftable pawls, one for each unit, each pawl controlling a corresponding shiftable transmission gear for the intermittent gears of the selected one of said units.

Another feature relates to a shaft to be selectively positioned under control of a series of shaft rotating and stopping units and a pawl selector rotatable cam drum, the drum and shaft being operated in predetermined timed relation from a common driving motor. Each of the said units comprises a member releasably clamped to the said shaft and carrying a pair of oppositely rotatable gears which are driven by a corresponding pair of single-toothed stop rings rotatable around said shaft, and whose conjoint rotation to a mutual stopping point determines the extent of the shaft rotation.

A further feature relates to the novel organization, arrangement and relative interconnection of parts which cooperate to provide an improved and compact automatic self-positioning and control unit.

Other features and advantages not specifically enumerated will become apparent after a consideration of the following detailed descriptions and the appended claims.

In the drawing,

Fig. 1 is a side elevation view of the device according to the invention.

Fig. 2 is a right-hand end view of Fig. 1, with certain of the parts broken away to show more clearly the internal construction.

Fig. 3 is an enlarged detailed view of one of the selective shaft stopping units of Fig. 1.

Fig. 4 is a sectional view of Fig. 3, taken along the line 4—4 thereof, viewed in the direction of the arrows.

Fig. 4A is an enlarged view of part of Fig. 4.

Fig. 5 is a schematic electric wiring diagram of the control circuits of the device.

Referring more particularly to Figs. 1 and 2, the device comprises front and rear plates 10, 11, which are united at the corners by four crossbraces 12, 13, 14, 15. Mounted for rotation in suitable bearings in plates 10 and 11, is a power shaft 16, which is driven from a main driving shaft 17, carrying a worm 18, in mesh with a worm wheel 19, which is coupled to shaft 16 through the intermediary of a slip-friction clutch 20. This clutch for example can consist of friction discs 20a fastened to gear 19, and a cooperating set of friction discs 20b keyed to shaft 16. Shaft 17 also carries another worm 21 meshing with a worm wheel 22 to drive the limit switch mechanism 23 which acts to control the reversal of shafts 16 and 17 at the end of predetermined time intervals as will be described in connection with Fig. 5. The clutch 20 is inserted in series between the main drive shaft 17 and the power shaft 16 of the device, to limit the torque to be transmitted to the selector units A, B, C and D, to a predetermined amount, and to permit overtravel of the motor at certain stages of the tuning control cycle. Shaft 16 rotates only in a clockwise direction as seen in Fig. 2, and is restrained against counter-clockwise rotation by means of ratchet wheel 24 and cooperating pawl 25.

Fastened to shaft 16 are four wide-faced gears 26—29. Respectively meshing with each of the four gears is a corresponding idler transmission gear 30—33, each of which is rotatable mounted on a respective stud shaft 34—37 carried by respective shiftable pawls 38—41. These pawls have their upper ends freely surrounding a shaft 42 fastened at its ends to plates 10 and 11. Four wide-faced gears 43—46, freely surround the shaft 42 so as to be capable of rotation therearound. Each pawl can swing around the center of shaft 42 as an axis without changing the driving relation between the gears 43—46 and gears 30—33, but allowing gears 30—33 to be individually meshed and unmeshed with gears 26—29. The selective swinging motion of the pawls is controlled by a rotatable drum 47 fastened to shaft 48 which is rotatably mounted in plates 10 and 11. Drum 47 has a series of V-shaped notches or recesses 49—52, there being one such notch for each of the pawls with which it is in planar alignment. Each pawl has associated therewith a selective shaft stopping unit A, B, C, D. The notches in drum 47 are equally spaced around the periphery of the drum in a helical path, and each pawl adjacent its lower end has a V-shaped projecting lug 53 for registry with the corresponding notch 49—52 when the drum 47 is rotated to bring this notch into registry with the appropriate pawl lug. The pawls are normally urged towards the surface of drum 47 by respective tension springs 54—57, which are anchored at their lower ends to a transverse rod 58, and at their opposite ends are hooked into a corresponding opening 59 in the lower end of each pawl.

Also attached to shaft 48 is the rotatable brush or metal disc 60 of an automatic selector switch of the "finder" type having four bank contacts 61—64 carried by an insulator block 65 supported by insulating studs 66, 67, on plate 10. The contacts 61—64 are circumferentially spaced around the axis of plate 48 to correspond with the circumferential spacing of the corresponding recesses 49—52. The finder switch is adapted to be remotely controlled, and its selective setting controls the corresponding selective stopping of the motor 68 which drives shaft 17 and drum 47.

Extending between plates 10 and 11 parallel to shaft 42 is another fixed shaft 69 which has freely rotatable therearound a second set of four wide-faced gears 70—73, it being understood that the gears 70—73 are provided with suitable sleeves or the like, to prevent their sliding longitudinally of the shaft. It will be seen that gears 70—73 are paired and meshed respectively with the gears 43—46. The gears of each pair are in overlapping relation and they respectively drive corresponding pairs of gears 74—75, 76—77, 78—79, 80—81, of the shaft stopping units A, B, C and D respectively. Inasmuch as the units A, B, C and D are identical in construction, the description will be confined to the unit A. The gears 74 and 75 are mounted for independent rotation on and around a tuning control shaft 82, the forward end of which extends through plate 10 and is provided with a hand knob 83 and dial plate 83a. The rear end of shaft 82 is supported in a bearing member 83b mounted in plate 11, and the device to be tuned is mechanically connected to the outwardly extending rear end of shaft 82.

The length of shaft 82 between gears 74 and 81 has diametric opposite flats 84. Fastened to the right-hand end of shaft 82 by set screw 85 is a metal sleeve 86 which acts as one backing end or clamping thrust member for the four sets of units A, B, C and D. These four units are identical and one of them is shown in detail in Figs. 3 and 4. Fitted on to shaft 82 is a bushing 87 having a circularly round periphery around which gear 74 freely rotates. Bushing 87 has a bore with opposite flats corresponding to those on shaft 82 so that the said bushing is capable of limited sliding motion on the shaft but is forced to rotate as a unit with the shaft. Another similar bushing 88 is provided on the shaft and around which the gear 75 is freely rotatable. Adapted to be clamped between bushings 87, 88, is a circular disc 89 having a circular central opening 89a of approximately the same diameter as the curved periphery of shaft 82. A clamping ring 89a having a bore similar to that of bushings 87 and 88 is provided. The clamping ring 89a of the unit D is adapted to be pressed into clamping engagement with the bushing 88 of the said unit by means of a pin 90 which extends through a transverse slot 91 in shaft 82. The left-hand end of shaft 82 is internally threaded to receive a threaded shank 92 to which the thumb nut 93 is fastened. The right-hand end of shank 92 is adapted to engage the pin 90, thus by turning nut 93 counter-clockwise the selector discs 89 of units A, B, C and D are freed for independent presetting adjustment or angular orientation around the axis of shaft 82. It will be understood that when the discs 89 of the units A, B, C and D are thus preset and the nut 93 is tightened, that the said discs rotate as a unit with shaft 82.

As shown more clearly in Figs. 3 and 4, the gear 75 has attached thereto so as to be driven in unison therewith, a circular stop ring 94 having a single radial projecting stop lug 95. A similar stop ring 96 is attached to gear 74 and has a single radial stop lug 97. Rotatably fastened on disc 89 by means of stud 98 and so as to engage ring 94 is a gear 99 which has a stopping tooth 100 of twice the peripheral width of each of the remaining teeth of gear 99. A similar gear 101 is rotatably fastened on disc 89 by means of stud 102, the gear 101 being diammetrically opposite to gear 99 and having a single stopping tooth 103 equal in peripheral width to the width of two remaining teeth of gear 101.

It is clear therefore that the extent of angular rotation of disc 89, and therefore of shaft 82, will be determined by the conjoint engagement of tooth 100 with the cooperating stopping lug 95; and of tooth 103 with the cooperating stopping lug 97. Let it be assumed for example that in Fig. 4, the gear 74 is rotated in a counter-clockwise direction by gear 43, as a result of which the stop lug 97 advances the gear 101 clockwise an angular distance corresponding to the width of two teeth of gear 101, with each revolution of gear 74. Gear 101 is shown in Fig. 4 as having been rotated to a position wherein stop lug 97 engages the stopping tooth 103, immediately causing disc 89 and gear 101 to rotate as a unit counter-clockwise. At the same time, stop ring 94 and its stop lug 95 are rotated clockwise by gears 70 and 75, which causes gear 99 to rotate counter-clockwise the distance of one tooth of gear 99, each time lug 95 is engaged with the teeth of said gear 99. Since disc 89 is effectively clamped to shaft 82, this driving relation of lug 97 and gear 101 causes shaft 82 to be rotated until gear 99 is rotated to a position similar to that previously described for gear 101, namely, until lug 95 engages the stopping tooth 100. At this instant any further rotation of disc 89, and therefore of shaft 82, is positively prevented. This causes clutch 20 to slip but the motor keeps rotating until its main energizing circuit is effectively opened by the limit switch 23.

It should be observed that the outermost diameter of gear 101, for example, is related to the diameter of its stop ring 96, so that when the curved periphery of ring 96 equally straddles two adjacent teeth on gear 101 and when the single tooth 97 engages the top of the double length tooth 103, a locking effect is obtained as illustrated in the magnified view of Fig. 4A causing disc 89 to rotate bodily with gear 101. The same holds true of the gear 99 and its locking ring 94. In other words the stop rings with their respective stopping lugs cooperate with their respective gears 99 and 101 in the nature of a Geneva movement or intermittent gearing. Since the stopping tooth 103 is twice the width of each of the remaining teeth of gear 101, if gear 101 has an odd number of teeth it will be clear that the tooth 103 will be engaged twice by lug 97, but on the second engagement it will assume the locking or stopping relation as illustrated in Fig. 4A. The same holds true for gear 99 and its stop ring 94. Since stop rings 94 and 96 are driven in opposite directions, gears 99 and 101 will be turned towards a common locking position for shaft 82. However, before one of the stop rings can turn its associated gear, e. g., gear 99 to locking position, the said ring will merely turn. If only one stopping ring turns its associated gear to a locking position, then disc 89 and shaft 82 are rotated. This rotation continues until the opposite stopping ring reaches the locking relation with its associated gear.

From the foregoing, it will be seen that the particular shaft stopping unit A, B, C or D, which is to determine the selective stopping of shaft 82, will be controlled by which particular one of the pawls 38—41 is selected, since no driving power is transmitted to any of the gears of units A, B, C or D, unless the associated pawl-controlled gear 30—33 is shifted into mesh with the associated driving gear 26—29. In other words, by selectively positioning drum 47 under control of the finder switch, only the proper selected one of the pawls 38—41 will move sufficiently to bring its gear 30—33 into mesh with the proper unit A, B, C or D.

While the same motor is used for driving the units A, B, C and D as drives the pawl selector cam drum 47, the latter does not start to rotate immediately when shaft 17 begins to rotate. The drum shaft 48 is driven from shaft 17 through a lost-motion device 107, so that gear 105 makes a predetermined number of turns before transmitting driving torque to shaft 48. For a detailed description of a typical lost-motion device of this type, reference may be had to application Serial No. 515,250, filed December 22, 1943.

Referring to Fig. 5 taken in conjunction with the remaining figures, a description will now be given of the sequence of operations in undergoing a complete tuning cycle for shaft 82, it being understood that the device to be tuned or adjusted, e. g., a rotatable tuning condenser, is suitably fastened to the right-hand end of shaft 82 (Fig. 1). In Fig. 5, the parts which correspond to those of Figs. 1 to 4 bear the same designation numerals. At a suitably remote point is located a manually operable switch having a series of fixed or bank contacts 108—111 and a rotatable brush 112. Contacts 108—111 are multipled to respective bank contacts 61—64 in the automatic finder switch, with which cooperates the rotatable metal disc 60 having a marginal cutout 113. A new selected position for shaft 82 is selected by moving brush 112 to the appropriate bank contact which identifies the desired position, e. g., contact 110. This extends ground from brush 112 through contact 110, conductor 114, contact 63, disc 60, winding of relay 115, to grounded battery 116. Relay 115 operates its associated contact set, and connects battery 116 through front contact 117, arm 118, motor armature 119, front contact 120, arm 121, motor field winding 122, to ground. This causes gear 104 to be rotated in a counter-clockwise direction as seen in Fig. 2, but because of the ratchet and pawl 24, 25, shaft 16 is prevented from turning counter-clockwise. The clutch 20 therefore slips and drives gear 105 counter-clockwise, but because of the lost-motion device 107, shaft 48 and drum 47 do not rotate. A short interval thereafter the arm 123 of the limit switch 23 moves counter-clockwise sufficiently to enable contacts 124, 125, to close. When the lost motion in device 107 is finally taken up, drum 47 and switch disc 60 begin rotation in a counter-clockwise direction. When the open sector 113 finds the contact 63, the circuit of relay 115 is opened and this relay releases its contact set. The connections to the armature brushes 126, 127, are thereupon reversed by means of contacts 128, 129, 130, 118 and by means of the contacts 124, 125, of the limit switch.

Motor 68 now reverses its direction and drives shaft 16 and gears 26—29 in a clockwise direction. However, because of the lost-motion device 107, drum 47 and switch disc 60 remain in their previous selectively set positions. The shaft 131 of the limit switch also begins rotation in a clockwise direction, but because of the lost-motion device 132 between the said shaft and member 123, the contacts 124, 125, remain closed until after the tuning shaft 82 has been finally positioned. Preferably, although not necessarily, the lost-motion device 132 is similar to device 107. Since drum 47 had been stopped in a position to select pawl A, this pawl moves to the right (Fig. 2) since its lug 53 is in registry with recess 49. This enables gear 30 to move into mesh with gear 26, and as a result gears 43, 70, 74, 75, are rotated in opposite directions as hereinbefore described, causing rotation of disc 89 and shaft 82 to the proper extent, whereupon the said shaft is stopped. After a short interval, limit switch contacts 124, 125, open and break the main energizing circuit for the motor armature. However, a resistance 133 is permanently bridged across contacts 124, 125, to allow a limited amount of current to flow through the motor armature 119 to maintain a constant torque on the shaft 16, thus preventing any accidental shifting of the shaft 82 as a result of vibration, and the like.

It will be clear from the foregoing description that the angular orientations of the discs 89 of the units A, B, C and D may be preset to any desired position around the shaft 82. For example, by manually turning the drum 47 to select the pawl 38, the thumb nut 93 may then be unloosened permitting the shaft 82 to be turned without disturbing the position of the disc 89, whereupon the thumb nut 93 may be again tightened. With nut 93 unloosened and by turning the drum 47 to its successive positions, the pawls 39, 40 and 41, may be manually selected, thus enabling the respective discs 89 of units A, B, C and D, to be individually preset with respect to shaft 82, whereupon nut 93 can be tightened.

While in the foregoing there has been described a mechanism having four selective units A, B, C and D for determining four selective stopping positions of shaft 82, it will be understood that a greater or less number of units may be employed depending upon the number of selective stopping positions desired for shaft 82. It will likewise be understood that the number of selector pawls and the number of recesses in drum 47 as well as the number of bank contacts in the finder switch will be the same as the number of stopping positions desired.

While one particular embodiment of the invention has been described, various changes and modifications may be made without departing from the spirit and scope of the invention.

What is claimed is:

1. An automatic shaft positioning device for radio systems and the like, comprising a shaft to be selectively positioned, a plurality of selectively operable shaft stopping units connected to said shaft each unit including a pair of oppositely rotatable members whose conjoint rotation to a mutual stopping position determines the extent of rotation of said shaft, and means to render a selected one of said units effective, the last-mentioned means comprising a power driven shaft, a cam drum having a series of cam surfaces one for each of said units, and a selectively shiftable pawl one for each cam surface for conveying driving power from said shaft to the selected one of said units.

2. An automatic shaft positioning device for radio systems and the like, comprising a shaft to be selectively positioned, a plurality of selectively operable stopping units connected to said shaft for rotation therewith each unit comprising a pair of oppositely rotatable stop members the conjoint stopping of which determines the extent of rotation of said shaft, a pair of gears one for each of said stop members, a common power transmission gear for said pair of gears, a shiftable member for supporting said common gear, and a selectively positionable cam drum for controlling said shiftable member to move said common gear into and out of driving relation with said pair of gears.

3. An automatic shaft positioning device for radio systems and the like, comprising a shaft to be selectively positioned, a plurality of selectively operable stopping units connected to said shaft for rotation therewith each unit comprising a disc carrying a pair of oppositely rotatable gears, a pair of stop rings one for each of said gears and rotatable in opposite directions around said shaft to drive said pair of gears each respectively to a stopping position so that the conjoint stopping of both said gears determines the selective stopping of said disc, a common transmission gear for operating said stop rings, a shiftable member carrying said transmission gear, and a selectively rotatable cam drum for controlling said shiftable member to move said transmission gear into and out of driving relation with said stop rings.

4. An automatic shaft positioning device for radio systems and the like, comprising a shaft to be selectively positioned, a plurality of selectively operable stopping units connected to said shaft for rotation therewith, a plurality of selectively shiftable members one for each of said units, a selectively rotatable cam drum for selecting one of said shiftable members, each of said units including a pair of oppositely rotatable stop members whose conjoint stopping determines the extent of rotation of said shaft, and a transmission gear associated with each of said shiftable members for driving said stop members, said transmission gear being rendered selectively effective on said stop members by the associated shiftable member.

5. An automatic shaft positioning device for radio systems and the like comprising a shaft to be selectively positioned, a plurality of selectively operable stopping units connected to said shaft for rotation therewith, each unit comprising a set of intermittent gears rotatable in opposite directions to a mutual stopping point, a plurality of selectively shiftable gears one for each unit to drive the intermittent gears thereof, and selectively rotatable cam means for operating said shiftable gears into and out of driving relation with their associated intermittent gears.

6. An automatic shaft positioning device for radio systems and the like comprising a shaft to be selectively positioned, a selectively operable stopping unit connected to said shaft for rotation therewith, said unit comprising a pair of oppositely rotatable intermittent gears mounted for independent rotation on a common member, means releasably clamping said member for rotation as a unit with said shaft but enabling said member to be preset to any desired angular orientation around said shaft, and means to drive said gears to a mutual stopping point corresponding to the desired position of said shaft, the last-mentioned means comprising a pair of oppositely rotatable gears freely mounted for rotation around said shaft, a common transmission gear for the last-mentioned oppositely rotatable gears, and selectively operable cam-controlled means for moving said common transmission gear into driving relation with said oppositely rotatable gears.

7. An automatic shaft positioning device for radio systems and the like, comprising a shaft to be selectively positioned, a selectively operable stopping unit connected to said shaft for rotation therewith, said unit comprising a pair of oppositely rotatable intermittent gears mounted diametrically opposite each other on a common member, means releasably clamping said member for rotation as a unit with said shaft but enabling said member to be preset to any desired angular orientation around said shaft, means to drive said intermittent gears to a mutual stopping point corresponding to the desired extent of rotation of said shaft, and means to selectively control the effectiveness of said drive means; the last-mentioned means including a shiftable gear, a rotatable cam drum for controlling the shifting of said gear, and a remotely controlled selector switch for controlling the setting of said drum; and a common driving motor for said selector switch, said drum and said shaft.

8. An automatic shaft positioning device for radio systems and the like, comprising a plurality of members releasably clamped for rotation as a unit with said shaft but presettable in different angular orientations around said shaft to correspond with the desired selective positions of said shaft, a pair of independently rotatable intermittent gears diametrically carried by each of said members, a cooperating pair of intermittent gear operators rotatable around said shaft to move said intermittent gears to a mutual stopping point for said shaft, a transmission shaft, a plurality of shiftable gears one for each of said members, a rotatable cam drum, a remotely controlled selector switch, a common motor for driving said drum said switch and said transmission shaft, and means controlled by the selective setting of said switch and drum for operating a corresponding selected one of said shiftable gears to operate the said intermittent gears of the associated one of said members.

9. A shaft positioning device according to claim 8 in which said motor is reversible and is coupled to said transmission shaft and to said drum, said power shaft having means to restrain it against rotation in one direction while allowing said cam drum to rotate in opposite directions.

10. A shaft positioning device according to claim 8 in which said motor is reversible and is coupled to said transmission shaft and is also coupled to said cam drum through a lost-motion device, said power shaft having means to restrain it against rotation in one direction while allowing said cam drum to rotate in opposite directions.

11. A shaft positioning device according to claim 8 in which said motor is reversible and is coupled to said transmission shaft through a slip-friction clutch and is coupled to said cam drum through a lost-motion device, said transmission shaft having means to restrain it against rotation in one direction while allowing said cam drum to rotate in opposite directions.

12. An automatic shaft positioning device comprising a shaft to be selectively positioned, a plurality of selective shaft operating and stopping units; each unit comprising a pair of oppositely rotatable stop rings rotatable around said shaft, means to drive said stop rings in opposite directions, a member releasably clamped for rotation as a unit with said shaft but presettable in any desired angular orientation around said shaft, a pair of intermittent gears carried by each of said members and arranged to be operated intermittently by a corresponding one of said stop rings until both gears reach a mutual stopping point; a plurality of selectively shiftable pawls, a selectively rotatable cam drum for operating said pawls, and means responsive to the selective operation of one of said pawls for transmitting power only to a particular one of said units and thence to said shaft.

13. An automatic shaft positioning device for radio systems and the like comprising a shaft to be selectively positioned, a plurality of selectively operable shaft rotating and stopping units connected to said shaft; each unit including a pair of oppositely rotatable members whose conjoint rotation to a mutual stopping point determines the stopping of said shaft, a transmission shaft common to said units, a gear train for each unit for coupling it to said power shaft each gear train including a shiftable gear, a plurality of gear shift members there being one for each shiftable gear and on which the shiftable gear is rotatably mounted, a selectively rotatable cam drum for selectively operating said gear shift members, a single reversible drive motor for said transmission shaft and for said cam drum, means to restrain said transmission shaft against rotation in one direction, and a lost-motion connection between said motor and said drum to allow said drum to remain in its selectively stopped position when said motor reverses to rotate said transmission shaft.

14. An automatic shaft positioning device for radio systems and the like comprising a shaft to be selectively positioned, a plurality of selectively operable shaft rotating and stopping units connected to said shaft; each unit comprising a pair of bushings slidably keyed to said shaft, a pair of idler gears through which said bushings freely pass to allow said idler gears to rotate around said shaft, a toothed stop ring for each gear and driven as a unit therewith, a member releasably clamped between said bushings, a pair of diametrically opposite gears rotatably attached to said member each being in operative driven relation with a corresponding one of said toothed stopping rings, means releasably clamping all said units together on said shaft, a plurality of pairs of gears one pair for each said unit for driving the idler gears thereof in opposite directions, means to selectively drive any pair of said plurality of gears without driving the remaining pairs of gears, the last-mentioned means including a common transmisison shaft carrying a series of gears one for each unit and in mesh with the corresponding pair of said plurality of pairs of gears in the said unit, a plurality of shiftable gears one for each unit and permanently in mesh with corresponding pair of said plurality of pairs of gears, and means comprising a selectively rotatable cam drum for selectively moving any one of said shiftable gears into and out of mesh with the corresponding gear carried by said transmission shaft.

15. An automatic shaft positioning arrangement for radio systems and the like, comprising a shaft to be selectively positioned, a plurality of selectively operable shaft stopping units each including a pair of oppositely rotatable members whose conjoint rotation to a mutual stopping position determines the extent of rotation of said shaft, means to render a selected unit effective to stop said shaft, the last-mentioned means comprising a common transmission shaft for the units, a gear train for each unit for coupling said power shaft to said units, each gear train including a selectively shiftable gear for rendering said transmission shaft effective on only a selected one of said units, a selectively rotatable cam drum for operating said shiftable members, a common driving motor for said gear trains and said drum, a main power driving shaft between said motor and said gear trains, a limit switch for automatically reversing the direction of the motor rotation at the end of a predetermined number of revolutions of said main driving shaft, means to restrain said transmission shaft against rotation in one direction while allowing said drum to rotate in opposite directions, a slip-friction clutch between said main driving shaft and said transmission shaft, and a lost-motion device between said main driving shaft and said drum to allow said drum to remain in its selectively stopped position when said motor and transmission shaft reverse their direction of rotation.

16. An automatic shaft positioning device according to claim 2 in which said cam drum comprises a series of recesses one for each of said shiftable members said recesses being arranged in staggered relation around the periphery of said drum.

17. An automatic shaft positioning device according to claim 2 in which said shiftable members are in the form of pawls which are normally urged towards the periphery of said drum said pawls and drum having cooperating camming surfaces for successively shifting said pawls as said drum is rotated.

18. An automatic shaft positioning device according to claim 5 in which each set of intermittent gears comprises a toothed gear having one tooth with a peripheral face which is approximately the width of two of the remaining teeth and a single toothed driving member for said toothed gear and cooperating with said wide tooth to act as a locking stop.

19. An automatic shaft positioning device according to claim 7 in which each of said intermittent gears has a single tooth which is approximately twice as wide as each of the remaining teeth and the said means to drive said intermittent gears includes a rotatable ring having a single tooth which acts as a locking stop with the wide tooth of the associated intermittent gear.

RICHARD W. MAY.

REFERENCES CITED

The following references are of record in the file of this patent:

UNITED STATES PATENTS

| Number | Name | Date |
|---|---|---|
| 2,229,634 | Bonham | Jan. 28, 1941 |
| 2,411,617 | Elliott | Nov. 26, 1946 |